(12) United States Patent
Liu et al.

(10) Patent No.: US 7,696,444 B2
(45) Date of Patent: Apr. 13, 2010

(54) DEVICE FOR VARYING CAPACITANCE

(75) Inventors: Yingjian Liu, Beijing (CN); Honggang Wang, Beijing (CN); Bojun Song, Beijing (CN); Liang Zhao, Beijing (CN)

(73) Assignee: Hanwang Technology Co., Ltd., Beijing (CN)

( * ) Notice: Subject to any disclaimer, the term of this patent is extended or adjusted under 35 U.S.C. 154(b) by 687 days.

(21) Appl. No.: 11/657,724

(22) Filed: Jan. 25, 2007

(65) Prior Publication Data

US 2007/0180923 A1 Aug. 9, 2007

(30) Foreign Application Priority Data

Jan. 26, 2006 (CN) .................. 2006 1 0011283

(51) Int. Cl.
*H04L 15/00* (2006.01)
(52) U.S. Cl. ..................................... 178/19.03; 345/179
(58) Field of Classification Search ... 178/19.01–19.07; 345/179
See application file for complete search history.

(56) References Cited

U.S. PATENT DOCUMENTS 3,958,234 A * 5/1976 Hoo ........................... 345/182
5,502,568 A * 3/1996 Ogawa et al. ............... 356/620
5,844,506 A * 12/1998 Binstead ...................... 341/34

* cited by examiner

*Primary Examiner*—Richard Hjerpe
*Assistant Examiner*—Sahlu Okebato
(74) *Attorney, Agent, or Firm*—Browdy & Neimark, PLLC

(57) ABSTRACT

Disclosed is a device for varying capacitance which pertains to the field of application of electronic devices and components. The technical essentials of the present invention lie in that: two dielectrics are disposed in parallel with an isolation layer interposed therebetween; the two dielectrics each are connected to an electrode at the same one end face thereof; the other end face of each of the two dielectrics is provided with an elastic conductive pad; a gasket is provided between the two dielectrics and the elastic conductive pads. The relative position and compressed area between the elastic conductive pads and the dielectrics vary according to the magnitude of the external force so that the capacitance between the electrodes of the dielectrics is varied accordingly within a certain range. Therefore, once the value and the variation of the capacitance between the electrodes are measured, the magnitude and the status of the external force which brings about the variation of the capacitance can be obtained. The device of the present invention has a simple structure and high sensitivity. Also, it has a definite zero initial value and a maximum value of the capacitance, and therefore is easy for handing and measurement.

20 Claims, 5 Drawing Sheets

DEVICE FOR VARYING CAPACITANCE

BACKGROUND OF THE INVENTION

1. Field of the Invention

The present invention relates to a device for varying capacitance, and reflecting pressure-variation on it by means of the variation of the capacitance, which pertains to the field of the application of electronic devices and components.

2. Description of the Related Art

With the increasing improvement in the design of the consumptive electronic products as well as the increment of the demand of the user, there are more and more occasions in which a varying external physical quantity needs to be measured, controlled and responded. Pressure sensing techniques are examples adopted in such occasions, which are widely used in many technical fields, such as a handwriting pen in the input apparatus of a computer. When the writer uses the handwriting pen, a real time feedback to the pressure is required. That is, the variation of the magnitude of the acting force upon writing should be quickly and timely reflected on an apparatus or an application software and displayed on the computer screen so that a status of force applied by the user upon writing, for example, whether a light, heavy, quick, or slow writing is done, can be reflected.

In order to achieve the aforesaid purpose and effect, several solutions have been provided. In particular, the Japanese patent No. JP2001319831 provides a solution which relates to a pressure measurement device wherein a dielectric has two end faces with one end face having two electrodes and the other end face having one flexible electrode; a predetermined gap is provided between the flexible electrode and the other end face; While being applied with an external force, the flexible electrode can generate a relative variation with respect to the other end face; and when the relative variation is generated, a parameter associated with the applied external force can be obtained.

The above solution has obvious defects which are mainly represented as below: two electrodes are connected to one dielectric, which is equivalent to one porcelain dielectric capacitor. Therefore, there is an initial value of capacitance. When the flexible electrode is brought into contact with the dielectric and the contacting area varies, the amount of the variation of the capacitance is established on the basis of the initial capacitance value as the minimum capacitance value. In fact, the capacitance value when the flexible electrode just contacts the dielectric is identical to the initial capacitance value, and it is difficult to distinguish between variation value and the initial value, which causes inconvenience in the sensing and controlling operation. Therefore, the manufacturing level must be improved, and in particular, the requirement for manufacturing the devices tends to be much more stricter. In addition, the Japanese patent No. JP1990-0206774 is slightly different from the previous solution. Although there is a zero initial value, the structure of the latter Japanese patent is complicated and troublesome for manufacturing and production, and the reliability of the product is reduced.

SUMMARY OF THE INVENTION

The present invention has been made to overcome one or more aspects of the above mentioned disadvantages. Accordingly, it is an object of the present invention to provide a device which can sense the variation of the capacitance according to the magnitude of an external force, and has definite zero initial value and allows for varying capacitance in a certain range.

According to one aspect of the present invention, a device for varying capacitance is provided, comprising: a first dielectric and a second dielectric, the first dielectric and the second dielectric being arranged in parallel and spaced apart from each other to form an isolation layer therebetween; a first electrode and a second electrode, the first electrode and the second electrode are connected to the first dielectric and the second dielectric at the same one end face of the first dielectric and the second dielectric, respectively; an elastic conductive pad being disposed at the other end face opposite to the one end face; and a gasket being disposed between the first dielectric and the second dielectric and the elastic conductive pad.

Preferably, the device for varying capacitance further comprises a contact probe, the contact probe being configured to apply an acting force on the elastic conductive pad when an external force is applied on it.

Preferably, the first dielectric and the second dielectric are disposed in a mirror-symmetrical manner.

Preferably, the device for varying capacitance further comprises a housing, wherein the first dielectric and the second dielectric are disposed in the housing abutting against the inner wall of the housing.

Preferably, the shape of the first electrode and the second electrode is substantially identical with that of the first dielectric and the second dielectric respectively, and the first electrode and the second electrode being tightly attached to the same one end face of the first dielectric and the second dielectric respectively.

Preferably, the isolation layer is filled with material of low dielectric constant.

Preferably, the isolation layer is filled with air.

Preferably, the elastic conductive pad is made of elastic conductive material.

Preferably, the gasket is made of a material of low dielectric constant.

Preferably, the gasket is configured to have an annular shape.

Preferably, the contact probe has an end face configured to have a convex shape which is higher in the middle and lower in the periphery.

Preferably, an elastic conductive body is further disposed between the contact probe and the elastic conductive pad.

Preferably, an elastic conductive body is further disposed between the elastic conductive pad and the gasket.

Preferably, the first dielectric and the second dielectric are made of a material of relatively high dielectric constant.

Preferably, the first dielectric and the second dielectric constitute a circular shape.

Preferably, the convex shape of the contact probe is a conical shape or a shape of spherical cap.

According to another aspect of the present invention, a handwriting inputting device is provided, which comprises the device for varying capacitance according to the above aspect of the present invention.

The advantageous technical effect of the present invention lies in that: the device of the present invention has a simple structure, a definite zero initial value, a high sensitivity with wide sensing range. Also, the device of the present invention is capable of sensing minor variation and easy for sensing and measurement and agile in controlling.

BRIEF DESCRIPTION OF THE DRAWING

Detailed description of the present invention will be made in the following with reference to the accompanying drawing.

LIST OF REFERENCE NUMERALS

| | |
|---|---|
| 1. | pen body |
| 2. | circuit board |
| 3. | pen tip |
| 4. | inductive coil |
| 5. | dielectric structure |
| 51. | contact probe |
| 52. | elastic conductive pad |
| 522. | elastic conductive body |
| 53. | gasket |
| 533. | elastic conductive body |
| 54. | dielectric |
| 55. | dielectric |
| 56. | electrode |
| 57. | electrode |
| 58. | isolation layer |
| 59. | housing |

DETAILED DESCRIPTION OF THE PREFERRED EMBODIMENT

Reference will now be made in detail to the preferred embodiments of the present application. It can be appreciated that various modification in many different ways can be made to the following illustrative embodiments of the present invention without departing the principle of the present invention disclosed herein. Therefore, the scope of the present invention will in no way be limited to the special embodiments in the following.

Figure 1:
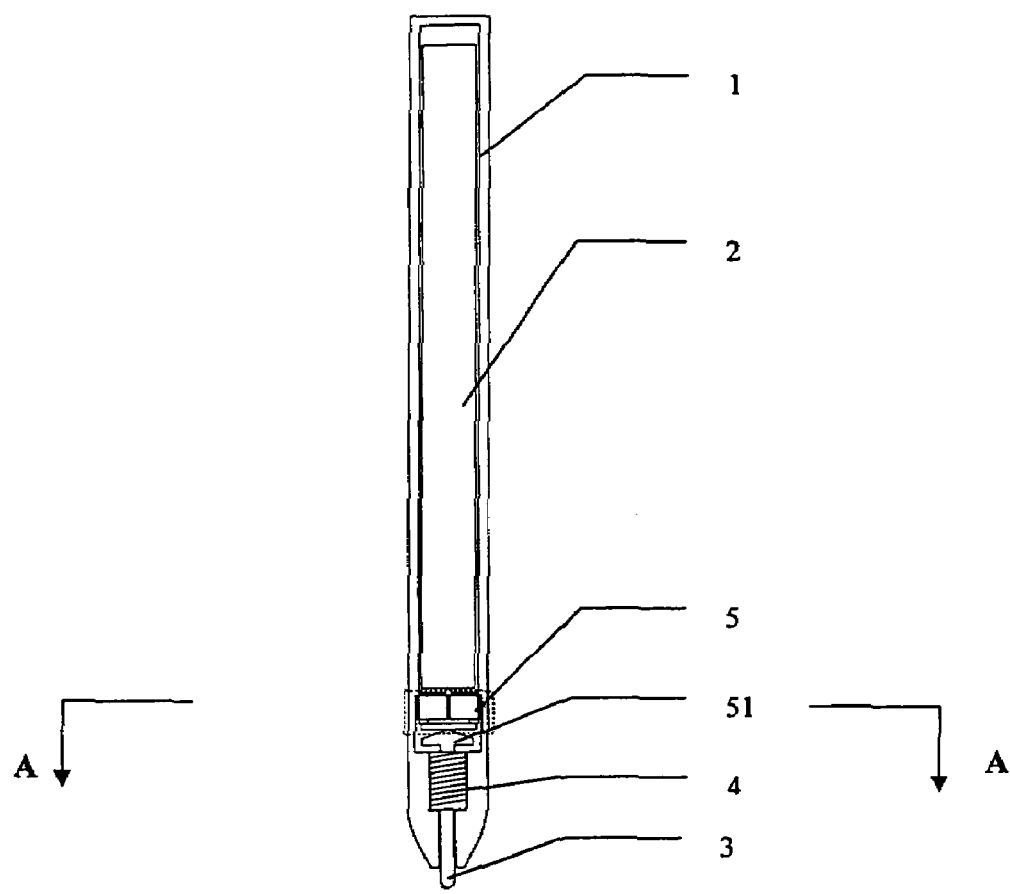
FIG. 1 is a schematic view of an embodiment of an apparatus for varying capacitance.

The device of the present invention is adapted to be used in the handwriting pen apparatus for inputting data to a computer. The present embodiment employs an device as shown in FIG. 1, which comprises a pen body 1, a circuit board 2 in the pen body 1, a pen tip 3 in the front end of the pen body, an inductive coil 4 and a dielectric structure 5. A contact probe 51 is integrated with the pen tip 3 as a whole. The inductive coil 4 is disposed between the contact probe 51 and the pen tip 3.

Figure 2:
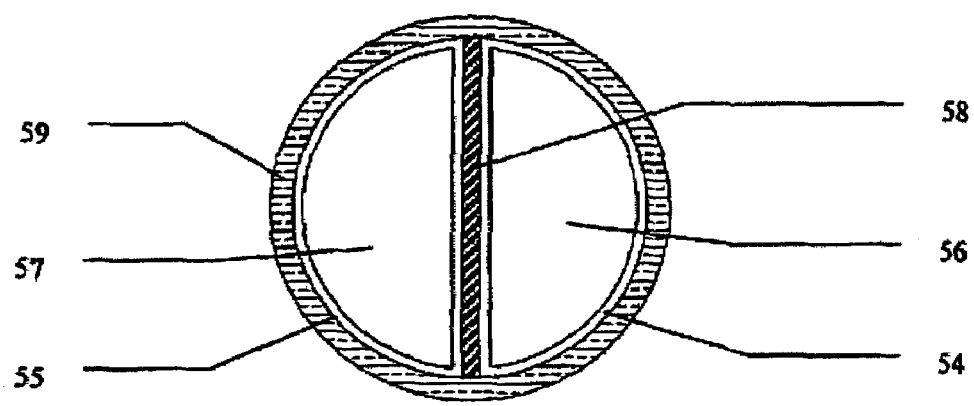
FIG. 2 is a sectional view taken along the A-A line in the apparatus shown in FIG. 1.
Figure 3:
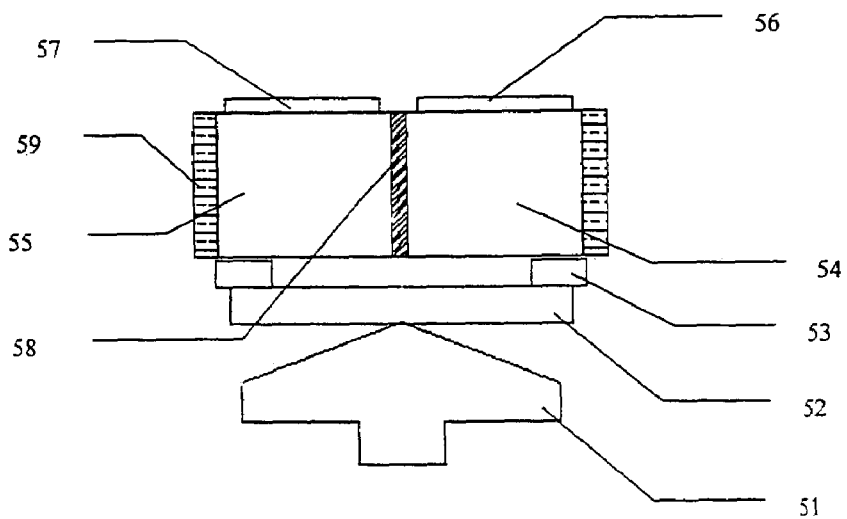
FIG. 3 is a longitudinal sectional view showing an initial status of the structure of the dielectric of the present invention in the apparatus of FIG. 1.

FIG. 2 is a sectional view along the line A-A of the device shown in FIG. 1. FIG. 3 is a longitudinal view showing an initial state of the dielectric structure of the apparatus in FIG. 1. The dielectric structure 5 comprises the contact probe 51, an elastic conductive pad 52, a gasket 53, a first dielectric 54, a second dielectric 55, a first electrode 56, a second electrode 57, an isolation layer 58 and a housing 59.

The end face of the contact probe 51 has a convex shape which is higher in the middle portion and lower in the periphery. Specifically, it can be a conical shape or a shape of spherical cap. Upon receiving a force, the contact probe 51 directly acts on one end face of the elastic conductive pad 52. The elastic conductive pad 52 is made of an elastic conductive material, which deforms upon receiving an external force and restores to its original shape after the external force is withdrawn. On the other end face of the elastic conductive pad 52 are arranged the first dielectric 54 and the second dielectric 55 in parallel, which are made of material of relatively high dielectric constant. The gasket 53 made of material of low dielectric constant is disposed between the two dielectrics and the elastic conductive pad 52. In a preferred embodiment, the gasket 53 is configured to be an annular body. Obviously, the gasket 53 may take the form of two gaskets separate from each other. The first dielectric 54 and the second dielectric 55 are separated from each other to form the isolation layer 58, which has very low dielectric constant and may be formed naturally by air or may be filled with material of low dielectric constant. The first dielectric 54 and the second dielectric 55 are symmetrical in shape, disposed in such a way that they form a mirror image to each other, for example, both are of a semi-circular shape and face each other while centering on a center of a circular shape. That is to say, the first and second dielectrics plus the isolation layer 58 constitute a complete circle. The first and second dielectrics 54 and 55 are semi-circular or substantially semi-circular in shape in the present embodiment. The other end face of the first and second dielectrics 54 and 55 are connected to the first electrode 56 and the second electrode 57 respectively. As shown in FIG. 2, the shape of the first electrode 56 and the second electrode 57 are substantially identical with or correspond to that of the first dielectric 54 and the second dielectric 55 respectively. Further, the first electrode 56 and the second electrode 57 are tightly attached to or abut against an end face of the first dielectric 54 and the second dielectric 55, respectively.

Figure 8:
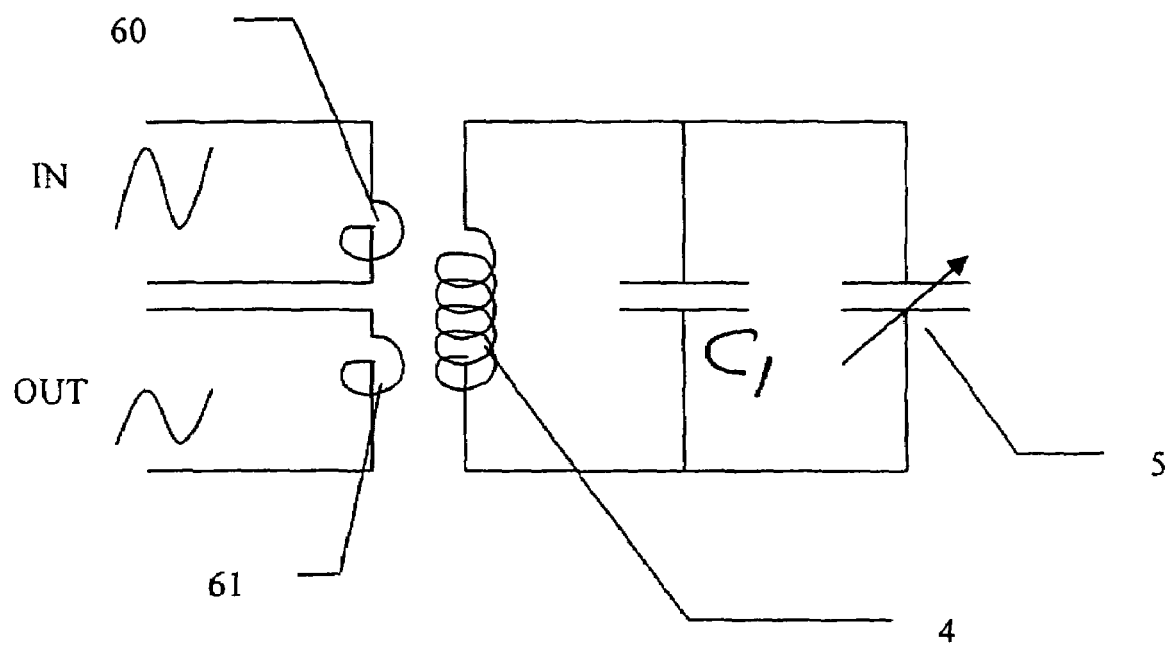
FIG. 8 is a schematic view showing the circuit construction which includes the dielectric structure according to the present invention.

Lead wire or conductor is led out from the first electrode 56 and the second electrode 57. In one application of the present invention, as shown in FIG. 8, the first electrode 56 and the second electrode 57 of the dielectric structure 5 are further connected to a resonant circuit, which can generate resonance in response to an oscillation signal of a certain frequency and receive a resonant signal by a receiving circuit. The resonant circuit can sense the variation of the pressure by receiving an associated resonant signal. Specifically, If the first electrode 56 and the second electrode 57 are connected to a capacitance-inductance or resistance-capacitance oscillating circuit or other similar oscillating circuit, a frequency value and associated characteristics can be obtained by varying the oscillating frequency via the variation of the capacitance. Based on this variation of the frequency parameter, a feedback to the variation of electrode capacitance on the dielectrics, i.e. a status of force on the pen tip 3, is obtained.

Further, in order to ensure the first dielectric 54, the second dielectric 55 and the isolation layer 58 combine with each other well, a housing 59 is provided at outside thereof for reinforcing and stabilizing purpose, so that tight combination between them is guaranteed.

Next, the operation of the present embodiment will be explained in the following. Since the contact probe 51 and the pen tip 3 are integrated as a whole, they always are in the same status. The initial state is assumed as a state in which the pen tip 3 is not subject to an external force. Then as shown in FIG.

Figure 5:
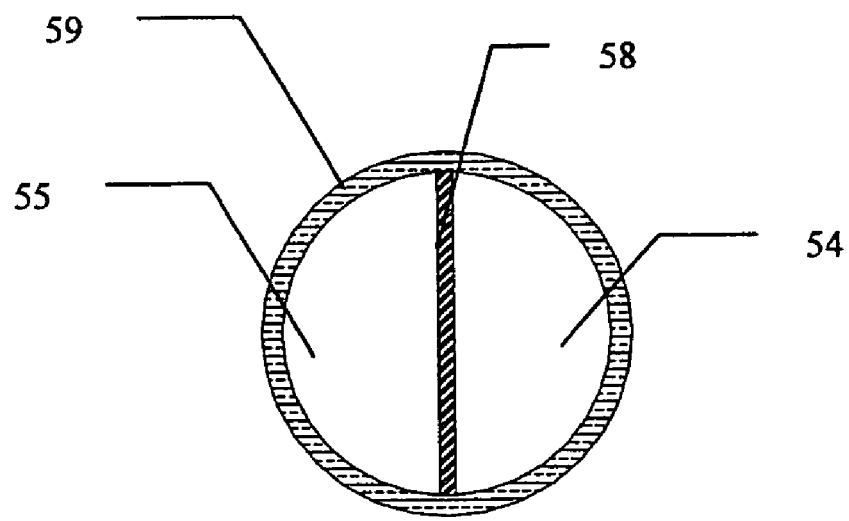
FIG. 5 is a sectional view showing a status of the end face of the dielectric and the elastic conductive pad without external force.

1, 3, the pen tip 3, the contact probe 51 and the elastic conductive pad 52 are all in an initial state, i.e. not under effect of any external force. At this time, the isolation layer 58 makes the first dielectric 54 and the second dielectric 55 separate from each other, and the capacitance between the first electrode 56 and the second electrode 57 can be neglected, i.e. has an initial value of zero. At the time of initial value of zero, the compression between the elastic conductive pad and the end face of the dielectrics is shown in FIG. 5.

Figure 4:
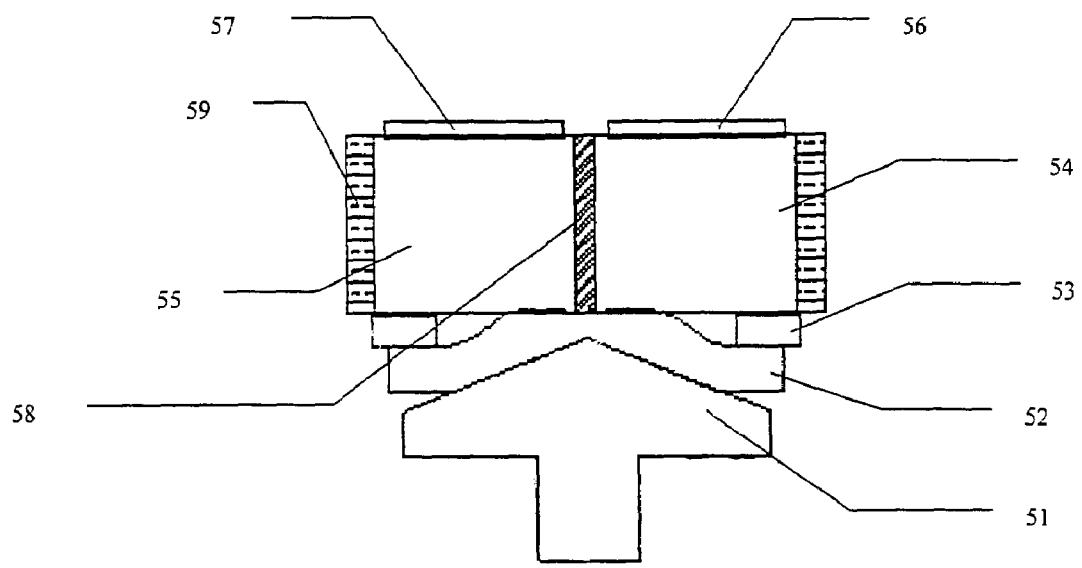
FIG. 4 is a longitudinal sectional view showing the structure of the dielectric of the present invention in the apparatus of FIG. 1 under pressure.

FIG. 4 is a longitudinal sectional view showing the dielectric structure of the apparatus in FIG. 1 in a status under effect of an external force. When the pen tip 3 is subject to an external force, that is, when handwriting by pen is conducted on a desk surface or other plane, an action of force, which is varying, is generated. The force and the variation thereof are transmitted to the contact probe 51 by the pen tip 3 and further acts on the elastic conductive pad 52; the elastic conductive pad 52 then deforms and acts on the end face of the first dielectric 54 and the second dielectric 55. The elastic conductive pad 52 is a good electrical conductor, which makes the first dielectric 54 and the second dielectric 55 be previously independent of each other become an associated whole body, that is, two dielectrics are communicated with each other and produce a capacitance between the first electrode 56 and the second electrode 57.

Figure 6:
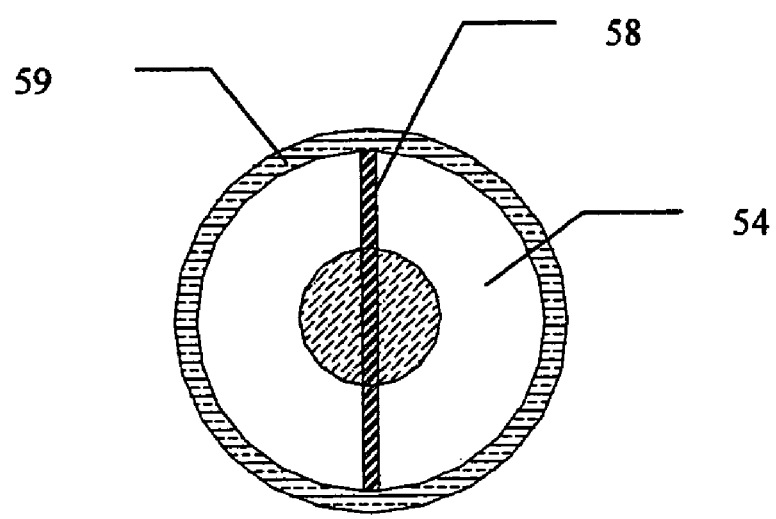
FIG. 6 is a sectional view showing a status of the end face of the dielectric and the elastic conductive pad under external force.

FIG. 6 is a sectional view showing a state in which the end face of the dielectrics and the elastic conductive pad are subject to an external force. As shown in FIG. 4, when the elastic conductive pad 52 begins to compress the end faces of the first dielectric 54 and the second dielectric 55, a minimum capacitance is generated between the first electrode 56 and the second electrode 57. The greater the force on the contact probe 51, the greater the deformation of the elastic conductive pad 52, and therefore, the greater the compression area at which the elastic conductive pad 52 compresses the end faces of the first dielectric 54 and the second dielectric 55. The area of the hatched portion in FIG. 6 represents the dimension of the compression area. The capacitance between the first electrode 56 and the second electrode 57 gets greater along with the variation of the compression area until reaching a maximum value. Also, this capacitance value varies with the variation of the external force.

The above process is reversible. That is, when the external force is reduced, the deformation of the elastic conductive pad 52 gets small, and the compression area between the elastic conductive pad 52 and the end faces of the first and second dielectrics 54 and 55 gets smaller correspondingly, and therefore, the capacitance value between the first electrode 56 and the second electrode 57 gets less until reaching a minimum value. When the external force is withdrawn, the elastic conductive pad 52 returns to its original state due to its elasticity. Since the elastic conductive pad 52 returns to its initial state relative to the first dielectric 54 and the second dielectric 55, the capacitance between the first electrode 56 and the second electrode 57 restores to the initial value of zero.

Figure 7:
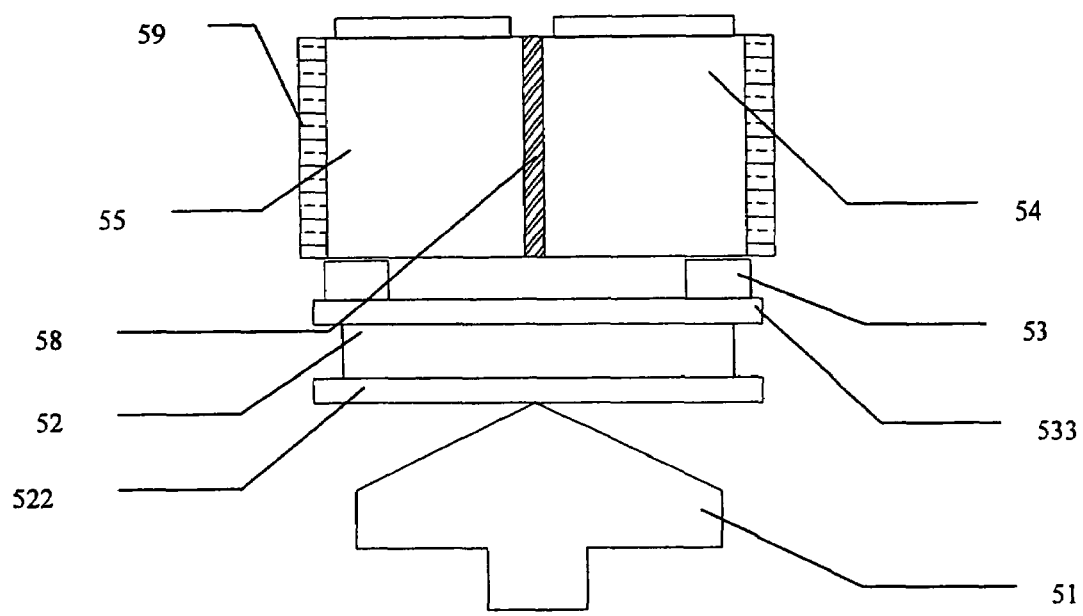
FIG. 7 is a sectional view showing an initial status of the structure of the dielectric of the present invention according to a further embodiment of the present invention.

FIG. 7 is the front view of further embodiment of the dielectric structure 5 according to the present invention. In order to reinforce and ensure the elasticity effect of the elastic conductive pad 52, an elastic conductor 522 is further provided between the contact probe 51 and the elastic conductive pad 52. More preferably, an elastic conductor 533 is further provided between the elastic conductive pad 52 and the gasket 53.

The above process can be conducted repeatedly, so that the value and variation of the capacitance between the first electrode 56 and the second electrode 57 can be measured and the mutual relationship therebetween along with variation of the external force can be obtained.

For the convenience of sensing the variation of the external force, it is desirable that the deformation generated when the contact probe 51 acts on the elastic conductive pad 52 tends to be more linear. For this purpose, the end face of the contact probe 51 is designed to be a convex shape which is high in the middle and low in the periphery, for example, to be a conical-like shape or a shape like spherical cap.

Now, referring to FIG. 8, detailed description will be made to the structure and operation principle of the dielectric structure 5 according to an example of the application of the dielectric structure 5 of the present invention. It is to be noted that, the example disclosed herein is just a preferred embodiment of the application of the dielectric structure 5 according to the present invention. As will be appreciated by those skilled in the art, the device for varying capacitance according to the present invention, i.e. the dielectric structure 5 may be applied to any device and system in which the capacitance variation is necessary. The following preferred embodiment shall not be interpreted as for limiting the protection scope of the present invention.

As is known by those skilled in the art, an active-oscillation transmitter coil can generate stable oscillation signal, such as a sine wave, a sawtooth wave, or the like. The dielectric structure 5 of the present invention can be regarded as a variable capacitor. As shown in FIG. 8, the dielectric structure 5 can be connected to a fixed capacitor C1 and an induction coil 4 in parallel. Therefore, the induction coil 4 and the dielectric structure 5 constitute a simple resonant circuit. As long as the inducted inductance and the capacitance are properly selected, the induction coil 4 can generate resonance to the oscillation signal generated by the oscillation transmitter coil 60 within an effective distance. At the same time, if an oscillation receiving coil 61 exists in the effective distance, the resonance signal can be sensed by it. Further, when the dielectric structure 5, i.e. the value of the variable capacitance varies, the oscillation frequency of the resonant circuit will also varies in proportion to the variation of the value of the capacitance. If an additional receiving coil (not shown) corresponding to the oscillation receiving coil 61 is further provided within the effective distance, the resonant signal can be received. In the forgoing description, the relation between the variation of the capacitance of the dielectric structure 5 and the external force applied on the dielectric structure have been described. By applying the above dielectric structure 5 in the circuit configuration shown in FIG. 8 and making use of the relation between the variation of the capacitance and the associated external force, a complete circuit and a system for sensing the status of an external force can be obtained and used for a handwriting pen for inputting data to a computer by handwriting. The device for varying capacitance of the present invention has a simple structure and a high sensitivity, and therefore, has high value for application.

Although preferred embodiments of the present application have been shown and described above, it is not intended to limit the scope, application and configuration of the present invention. Instead, it would be appreciated that, the scope of the present invention is defined only by the appended claims, and that some suitable modifications and variations can be made to the details of the present invention without departing from the spirit and scope of the present invention.

What is claimed is:
1. A device for varying capacitance, comprising:
 a first dielectric (54) and a second dielectric (55), the first dielectric (54) and the second dielectric (55) being arranged in parallel and spaced apart from each other to form an isolation layer (58) therebetween;

a first electrode (56) and a second electrode (57), the first electrode (56) and the second electrode are connected to the first dielectric (54) and the second dielectric (55) at the same one end face of the first dielectric (54) and the second dielectric (55), respectively, an elastic conductive pad (52) being disposed at the other end face opposite to the one end face; and a gasket (53) being disposed between the first dielectric (54) and the second dielectric (55) and the elastic conductive pad (52).

2. The device according to claim 1, further comprising:
a contact probe (51), the contact probe (51) being configured to apply an acting force on the elastic conductive pad (52) when an external force is applied on it.

3. The device according to claim 1, wherein:
the first dielectric (54) and the second dielectric (55) are disposed in a mirror-symmetrical manner.

4. The device according to claim 1, further comprising:
a housing (59), wherein the first dielectric (54) and the second dielectric (55) being disposed in the housing (59) abutting against the inner wall of the housing.

5. The device according to claim 1, wherein:
the shape of the first electrode (56) and the second electrode (57) is substantially identical with that of the first dielectric (54) and the second dielectric (55) respectively, and the first electrode (56) and the second electrode (57) being tightly attached to the same one end face of the first dielectric (54) and the second dielectric (55) respectively.

6. The device according to claim 1, wherein:
the isolation layer (58) is filled with material of low dielectric constant.

7. The device according to claim 1, wherein:
the isolation layer (58) is filled with air.

8. The device according to claim 1, wherein:
the elastic conductive pad (52) is made of elastic conductive material.

9. The device according to claim 1, wherein:
the gasket (53) is made of a material of low dielectric constant.

10. The device according to claim 1, wherein:
the gasket (53) is configured to have an annular shape.

11. The device according to claim 2, wherein:
the contact probe (51) has an end face configured to have a convex shape which is higher in the middle and lower in the periphery.

12. The device according to claim 2, wherein:
an elastic conductive body (522) is further disposed between the contact probe (51) and the elastic conductive pad (52).

13. The device according to claim 2, wherein:
an elastic conductive body (533) is further disposed between the elastic conductive pad (52) and the gasket (53).

14. The device according to claim 1, wherein:
the first dielectric (54) and the second dielectric (55) are made of a material of relatively high dielectric constant.

15. The device according to claim 3, wherein:
the first dielectric (54) and the second dielectric (55) constitute a circular shape.

16. The device according to claim 11, wherein:
the convex shape of the contact probe (51) is a conical shape or a shape of spherical cap.

17. A handwriting inputting device, comprising the device for varying capacitance according to claim 1.

18. The handwriting inputting device according to claim 17, further comprising:
a contact probe (51), the contact probe (51) being configured to apply an acting force on the elastic conductive pad (52) when an external force is applied on it.

19. The handwriting inputting device according to claim 17, wherein:
the first dielectric (54) and the second dielectric 955) are disposed in a mirror-symmetrical manner.

20. The handwriting inputting device according to claim 17, further comprising:
A housing (59), wherein the first dielectric (54) and the second dielectric (55) being disposed in the housing (59) abutting the inner wall of the housing.

* * * * *